United States Patent [19]

Levaillant et al.

[11] Patent Number: 5,512,741
[45] Date of Patent: Apr. 30, 1996

[54] TARGET ACQUISITION OPTOELECTRONIC SYSTEM WITH A VERY WIDE FIELD

[75] Inventors: Denis Levaillant, Villebon S/Yvette; Guy Timossi, Le Vesinet; Bertrand Remy, Cachan; Jacques Lonnoy, Paris; Jacques-Henri Rothenburg, Epinay sur Orge, all of France

[73] Assignees: Thomson-CSF, Puteaux; Societe Anonyme de Telecommunications - "SAT", Paris, both of France

[21] Appl. No.: 638,111

[22] Filed: Dec. 19, 1990

[30] Foreign Application Priority Data

Dec. 29, 1989 [FR] France .................................. 89 17427

[51] Int. Cl.⁶ .............................. G01C 21/02; G01J 5/02; G02B 26/08; G02B 23/02
[52] U.S. Cl. ....................... 250/203.3; 250/342; 250/347; 359/202; 359/211; 359/401
[58] Field of Search ................................ 359/202, 211, 359/401; 250/203.3, 342, 347

[56] References Cited

U.S. PATENT DOCUMENTS

| | | | |
|---|---|---|---|
| 3,428,812 | 2/1969 | Burke | 359/211 |
| 3,442,575 | 5/1969 | Rosin | 359/401 |
| 3,909,104 | 9/1975 | Menke | 359/211 |
| 4,300,160 | 11/1981 | Pusch et al. | 359/211 |

*Primary Examiner*—Stephen C. Buczinski
*Attorney, Agent, or Firm*—Oblon, Spivak, McClelland, Maier & Neustadt

[57] ABSTRACT

The system comprises a focusing optics in the focal plane of which a linear array of photodetectors is disposed. A double prism located opposite to said photodetectors with respect to said focusing optics, is servo controlled in rotation relative to a support about its longitudinal axis perpendicular to the axis of said optics, said support being itself servo controlled in rotation about said optical axis in order to scan a space of about $2\pi$ steradians. A derotating prism aligned with said optical axis rotates about said optical axis at a speed half of that of said double prism, in order to hold the image of the target in a single direction in said focal plane, whatever the rotations of said support.

7 Claims, 4 Drawing Sheets

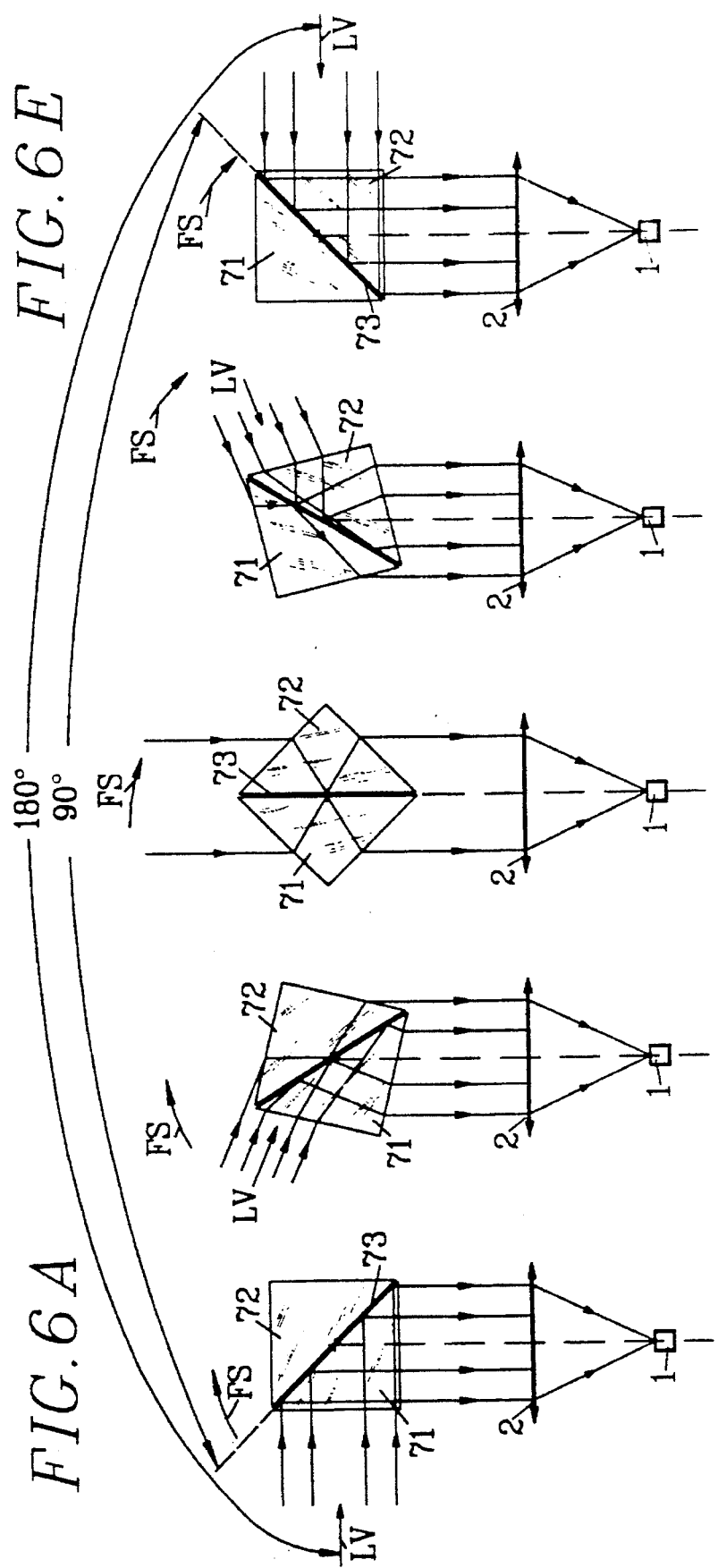

TARGET ACQUISITION OPTOELECTRONIC SYSTEM WITH A VERY WIDE FIELD

BACKGROUND OF THE INVENTION

The present invention relates to a target acquisition optoelectronic system with a very wide field, i.e., a system for the detection and the angular localization of a target within a very wide field of view, of about a half-space.

Such a system can be mounted in an aircraft. It allows then to detect enemy threats of the airplane or missile type.

Most of such optoelectronic surveillance systems utilize techniques for detecting the infrared radiation emitted by the targets. An infrared detector is placed in the focus of an optics. The role of the detector is to convert into an electrical signal the electromagnetic radiation emitted by the target and focused by the optics. By way of example, such systems are sensitive to optical wavelength ranges between 2 and 5 micrometers, or alternatively between 8 and 13 micrometers. The electrical signal produced at the detector is amplified. Electronic means for processing this signal allow to sense in it a sudden increase, corresponding to the passage of the image of a target at the infrared detector.

Infrared detectors generally have a sensitive area where the infrared flux must be focused to be converted into an electrical signal. This area has a small geometrical size. Typically, the size of the sensitive area is smaller than 1 mm$^2$, and often decrease to 50 µm×50µm. As a result, the field in which the target must be located to be detected is very small in the case of the use of a single detector placed in the focus of a lens. The field angle is equal to the quotient of the dimension of the sensitive area and the focal length of the lens, and is typically less than one angular degree. As this value of field angle does not allow to detect a target under favorable conditions, in general several sensitive areas are juxtaposed along a longitudinal axis to form a linear array of elemental infrared detectors. Typically, a few dozens of detectors are thus grouped. Placed in the focal plane of the lens, such a linear array of detectors covers a field having an angle close to a dozen of degrees along the longitudinal direction of the array, and a fraction of a degree along a direction perpendicular to the array.

Scanning an area in space is then performed by shifting the elemental field covered by the array, this field being displaced in the direction perpendicular to the longitudinal axis of the array.

Referring to FIG. 1, there is shown schematically a known acquisition system, often used, including a sensor assembly comprising a lens and a linear array of infrared detectors, and mounted so that it can rotate about the vertical, longitudinal axis of the array. Each of the elemental detectors is connected to processing means. The target is localized angularly in an angular "strip" thus scanned as soon as the processing means have detected an increase in the electrical signal provided by one of the detectors of the array thanks, for one, to the knowledge of the number of the detector having sensed the luminous flux and, for another, to the measurement of the angular direction aimed at by the system at the time of detection.

This type of optoelectronic infrared search system has the disadvantage of being highly limited in overall scanning field.

Other concepts have been tried. They use scanning optomechanical scanning devices of the oscillating mirror, rotary mirror polygone, or similar types used by pairs so as to scan several superposed strips. Even with these devices, scanning a full half-space, corresponding to 2 π steradians, is not possible.

SUMMARY OF THE INVENTION

A purpose of the present invention is consequently to remedy mainly this disadvantage thanks to a scanning device with two degrees of freedom allowing to cover a field wider than a half-space by means of a linear array of photodetectors.

To this end, a target acquisition system including optical focusing means and photodetector means disposed in the focal plane of the focusing means, comprises a double prism located opposite to said photodetector means with respect to the focusing means, first means for driving in rotation, relative to a support, said double prism about an axis X'X longitudinal with respect to said double prism and perpendicular to the optical axis Z'Z of said focusing means, second means for driving in rotation the support carrying the double prism about the optical axis Z'Z, and means located between the double prism and the focusing means to hold an image of the target in a single direction in the focal plane, whatever the rotations of the support carrying the double prism.

Under these conditions, the target acquisition optoelectronic system covers an overall search field of at least 2 π steradians. This space is scanned by means of a sequence of N strips whose angular width corresponds to the angle subtended by an array of the photodetector means placed in the focal plane of a lens. Each strip covers at least 180° in length and is centered on the vertical of the system defined by the optical axis when the system scans the upper half-space. The strips are scanned in a uniform manner in elevation by a rotational motion of the double prism-about an horizontal axis which is orthogonal to the vertical, optical axis. A support carrying the first optomechanical means which produce the scanning along the strips, is mobile about the vertical axis, which allows to progressively shift the strips in azimuth.

Using only two systems according to the present invention, the first system monitoring, for example, the upper half-space and the second system monitoring the lower half-space, allows to effect the surveillance of the full space surrounding an aircraft carrying these optoelectronic systems.

According to another aspect of the present invention, the first and second means for driving in rotation respectively the prism relative to its support, and the support relative to a fixed frame, have rotation speeds which are different and locked so as to scan in an optimum manner at least one half-space (2 π steradians). According to a first embodiment, the scanning pattern can be made up of "polar" strips implemented by the rapid scanning of the double prism having a first rotation with a uniform speed, said strips being progressively shifted by means of a second, slower rotation about the optical axis. According to a second embodiment, the scanning pattern can be made up or "parallel" strips produced by a rapid scanning about the optical axis, the strips being progressively shifted by means of a slower rotation of the prism about its longitudinal axis.

BRIEF DESCRIPTION OF THE DRAWINGS

Other features and advantages of the present invention will become apparent from a consideration of the following detailed description of preferred embodiments given as a non-limitative example with reference to the accompanying drawings, in which

FIGS. 6A through 6E are views of a single cross section of a scanning double prism of the system, shown in five successive rotational positions, respectively.

DESCRIPTION OF THE PREFERRED EMBODIMENTS

Figure 1:
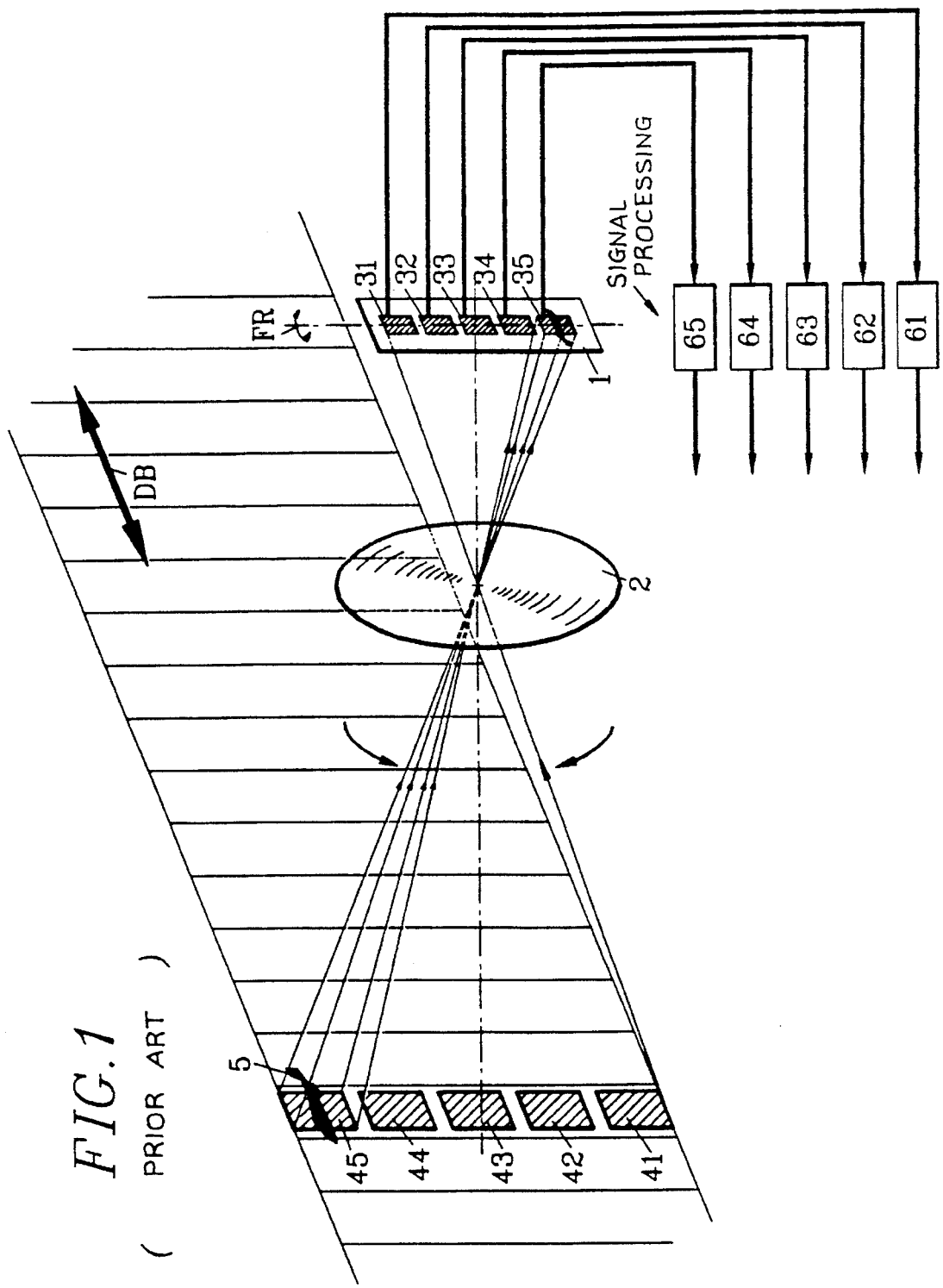
FIG. 1 is a schematic illustrating the scanning of a strip by means of a linear array of photodetectors according to the prior art method.

Referring to FIG. 1, the known principle of scanning a strip by means of a linear array of infrared photodetectors 1 is recalled. It has been assumed, by way of example, that the detector array comprises five elemental sensitive areas, also called "elemental detectors" 31 through 35. Focusing means comprising a converging lens 2 associate, at each time, with each of the elemental detectors 31 through 35 a respective area of space 41 through 45. The set of superposed areas 41 through 45 forms a vertical "strip" having a height which corresponds to the angular field covered by the array 1 placed in the focal plane of the lens 2. An arrow DB indicates the direction of scanning. This scanning can be obtained in a simple way by rotating the assembly formed made up of the lens 2 and the array 1 about an axis parallel to the longitudinal axis of the detecting array 1, which rotation is indicated by the arrow FR in FIG. 1.

Electronic processing means 61 through 65 are respectively connected to the elemental detectors 31 through 35. Each of the processing means is designed, for example, to signal an excess of the electrical signal delivered by the respective photodetector, with respect to a predetermined level. According to FIG. 1, this excess is reached in the processing means 65 connected to the detector 35 on which is focused the infrared flux emitted by the target aimed at by the system and shown at 5 and propagating through the area in space 45. It will be understood that this target 5 is located in area 45 when its image is received by the detector 35. The target 5 is also localized along the direction of scanning DB when the angle of rotation producing the scanning motion is known, at the time when the target 5 is detected.

Figure 2:
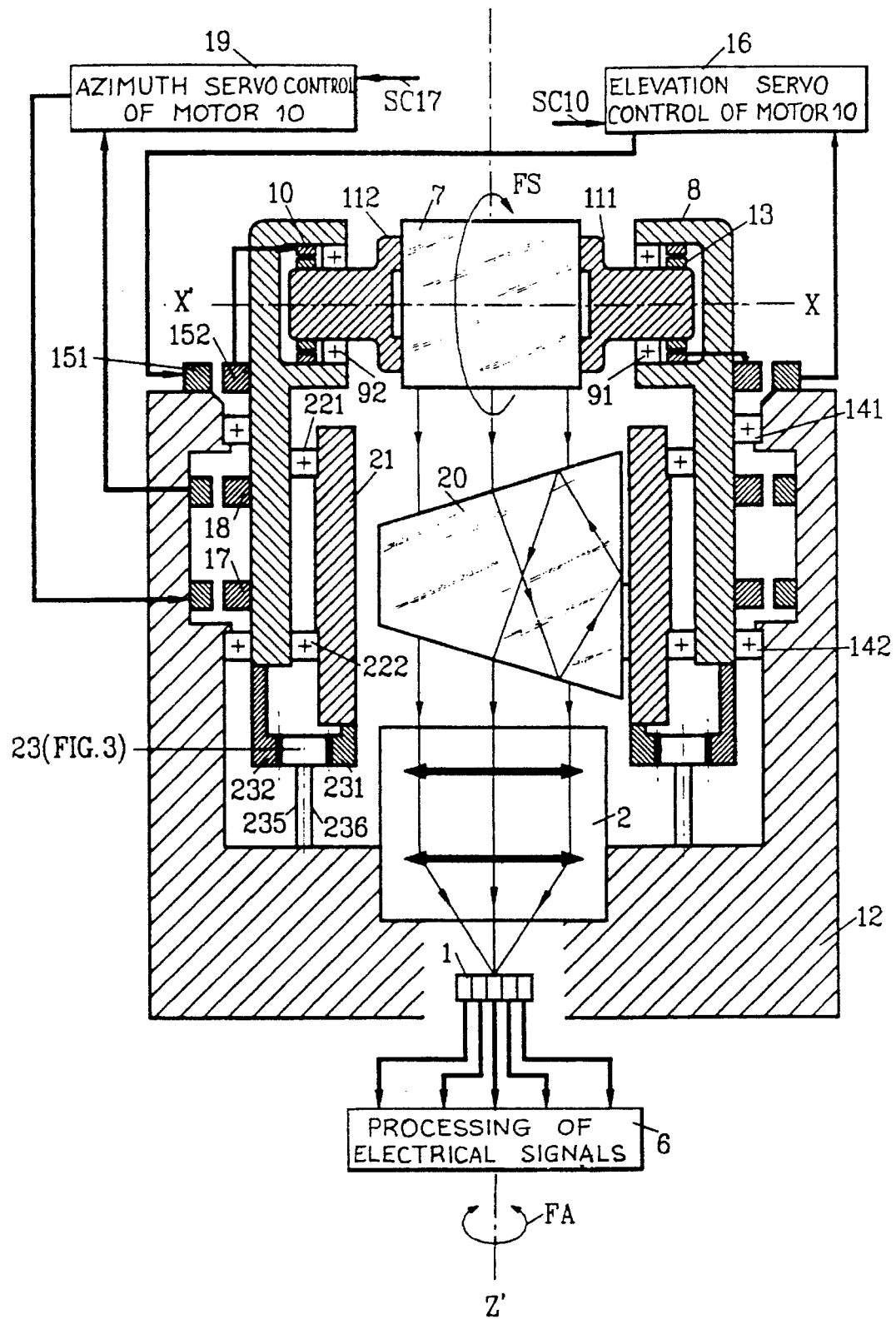
FIG. 2 is a schematic vertical diametral sectional view of a target acquisition optoelectronic system according to the invention.

Referring to FIG. 2, a target acquisition optoelectronic system with a very wide field according to the invention is shown. In this system, one can see again a linear array of infrared photodetectors 1, a focusing lens 2 and processing means 6 respectively processing electrical signals delivered by the elemental detectors of the array, that have already been described with reference to FIG. 1.

The optoelectronic system of the present invention comprises in addition a first prism 7, a first cylindrical support 8 in which the prism 7 is mounted to rotate about its diameter, and a fixed cylindrical frame 12 in which the support 8 is mounted to rotate coaxially.

The prism 7 is a right-angle regular double prism whose bases are attached, for example by bonding, to two journals 111 and 112 coaxial with a diameter of the upper portion of the support 8. This diameter defines an horizontal axis X'X longitudinal relative to the prism 7 and perpendicular to the vertical axis Z'Z common to the support 8, the frame 12 and the lens 2. Under these conditions, the prism 7 performs a scanning motion in elevation, in accordance with the arrow FS, during its rotation about the axis X'X. In this respect, the journals 111 and 112 are guided in rotation by ball bearings 91 and 92 disposed in two cylindrical facing cavities of the upper portion of the support 8. One, 112, of the journals is directly driven by a first electric motor 10 recessed in the support 8, and the other journal, 111, is associated with an elevation position sensor 13 also included in the support 8.

The support 8 is mobile in rotation about the azimuth axis Z'Z coincident with the optical axis of the lens 2. The upper portion of the frame 12 surrounds the lower portion of the support 8 which is guided in rotation in the frame 12 by means of ball bearings 141 and 142.

A rotary electrical joint 15 has an inner ring 152 attached to the external periphery of the support 8, and an outer ring 151 attached to the upper portion of the fixed frame 12. The rotary joint 15 serves to transmit, for one, signals of the position in elevation of the prism 7 from the sensor 13 to a servo control unit 16 for the motor 10, and, for another, ON/OFF and rotation direction and speed control signals from unit 16 to the motor 10. The unit 16 controls the operation of the motor 10 as a function of a predetermined set-point signal SC10 and in accordance with the elevation position signal.

In a similar manner, a second motor 17 serves to drive in rotation in the direction of the arrow FA the support 8 with respect to the fixed frame 12 about the optical axis Z'Z, an azimuth position sensor 18 is interposed between the support 8 and the frame 12, and a second servo control unit 19 controls the motor 17, and receives feedback signals from the position sensor 18 and a set-point signal SC17 for the motor 17.

Substantially in the center of the frame 12, the target acquisition optoelectronic system includes a second derotating prism 20, mobile in rotation about the azimuth Z'Z, which is a "Taylor prism" in a preferred embodiment. The prism 20 ensures the "derotation" of the image so that the image of the target aimed at in space and seen by the array 1 through the lens 2 remains oriented in a predetermined direction parallel to the longitudinal axis of the array, whatever the rotation, about the axis Z'Z, of the first support 8 carrying the bearings of the scanning prism 7. In other words, the image of the array 1 at the first prism 7 and through the second prism 20 is held parallel to the longitudinal axis X'X of the prism 7. The derotating prism 20 is attached inside a second cylindrical support 21 which is guided in rotation about the azimuth axis Z'Z through ball bearings 221 and 222 inside the rotary support 8. An article published in the journal "Optics and Laser Technology", August 1972, pages 175–188, entitled "Image rotation devices - a comparative survey" describes in detail the operation of the main usable derotating prisms.

In a particular embodiment of the invention, the second support 21 is mobile in rotation directly within the frame 12, and the first support 8 rotates concentrically about the frame 12. This variant does not introduce any significant difference in the definition or the optoelectronic system.

Because or a known optical property of the derotating prism 20, the angle of rotation or this prism must be equal to the half-angle or rotation or the support 8 at any timer the angles or rotation being measured with respect to a reference diameter or the fixed frame 12. According to a preferred embodiment of the invention, the rotational control of the second support 21 carrying the prism 20 is performed by means or the motor 17 controlling the rotation or the support 8, through a gear system 23 establishing the ratio ½ between the angles or rotation.

Figure 3:
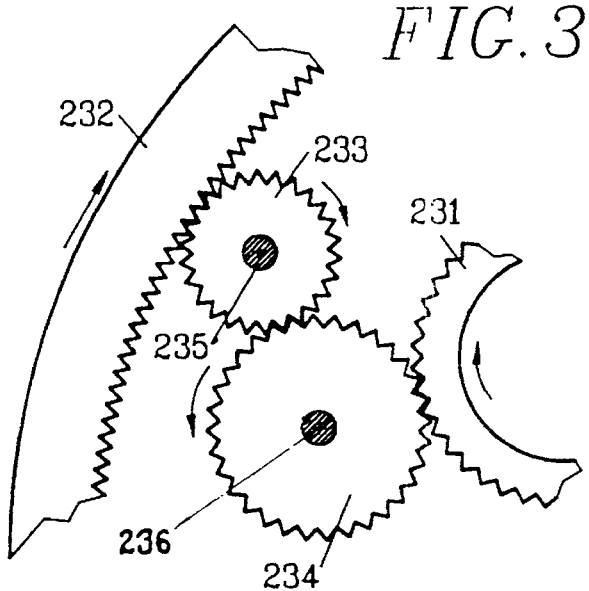
FIG. 3 is a plan view of a gear included in the system of FIG. 2.

As shown in FIG. 3 the gear system 23 comprises two ring gears 231 and 232, and at least one pair of planet wheels 233 and 234. The ring gears 231 and 232 are concentric with the axis Z'Z and respectively attached to the lower portion or the first and second support 8 and 21. The planet wheels 233 and 234 are disposed between the ring gears 231 and 232 and rotates through ball bearings about vertical shafts 235 and 236 parallel to the axis Z'Z and attached to the lower base or the frame accomodating the lens 2. The planet wheels 233 and 234 mesh with one another and respectively with the ring gears 231 and 232. According to the embodiment or FIG. 2, two pairs or planet wheels 233 and 234 are diametrally disposed between the ring gears. The planet gear 23 permits a rotation of the supports 8 and 21 in the same direction, and the angular ratio or ½ is obtained in particular through the ratio of the tooth numbers between the ring gears 231 and 232. According to another embodiment, an independent motor associated with a sensor and a servo control unit receiving the signal SC17 controls the rotation of the second support 21 carrying the prism 20.

The path followed by the light rays is schematically shown in FIG. 2 by means of lines with double arrows indicating the direction followed by the radiation. The path of the rays through the prism 20, the focusing objective 2 and up to the photodetector array 1 is shown. As an example, the derotating prism 20 is a regular prism with an isosceles trapezoid-shaped base, of the "Taylor" type, whose long rectangular side is reflecting and attached to the support 21, parallel to the axis Z'Z.

Figure 4:
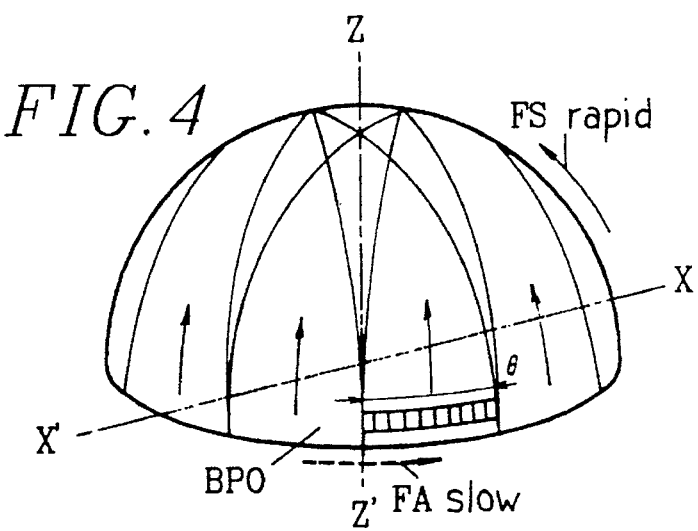
FIG. 4 is a schematic illustrating a first mode of scanning a half-space by means of "polar strips", achievable by means of the system of FIG. 2.
Figure 5:
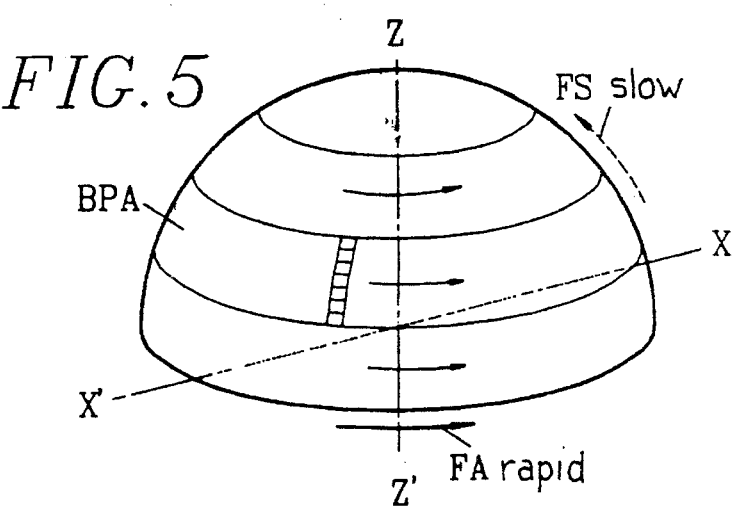
FIG. 5 is a schematic illustrating a second mode of scanning a half-space by means of "parallel strips", achievable by means of the system of FIG. 2.

FIGS. 4 and 5 illustrate two field scanning modes achievable by means of an optoelectronic system according to the present invention.

Referring to FIG. 4, a first so-called polar strip scanning mode BPO consists in a rapid elevation scanning performed by means of the rotation of the prism 7, and in a slow azimuth scanning performed by means of the rotation of the support 8 and, consequently, of the prism 20, allowing to progressively shirt a polar strip in azimuth. FIG. 4 gives a schematic representation of an area in space corresponding to a half-sphere, that is 2 π steradians. Each strip BPO corresponds to the scanning principle whose description has been given above with reference to FIG. 1. With the assumption of the present example, where the field being scanned is centered on the vertical, the strip scanning is an elevation scanning.

The overall angular length of a strip is assumed to be equal to 180° in FIG. 4. In practice, this angular length can be different and, in particular, can be longer than 180° in order to ensure the scanning of an area in space greater than a half-sphere. As a matter of fact, the rotation of the first prism 7 scanning space above an horizontal plane perpendicular to the axis Z'Z, can be extended downward, for example by 30°, even up to 90°, on either side of this plane.

The progressive shift in azimuth of the strips BPO occurs through rotation about the vertical axis Z'Z. If we denote by Q the angular width of a strip corresponding to the angle subtended by the array 1 in the focus of the lens 2, the complete scanning of the field requires an integer number N of strips at least equal to 180°/g, rounded to the higher integer. The rotation of the support 8 must be equal to a half-revolution, that is 180°, during the scanning of the N strips. This mode of scanning the field has the advantage of covering, in a simple manner, the half-sphere by means of a continuous rotation of optomechanical elements such as the prism 7, for one, and the support 8, the support 21 and the derotating prism 20, for another. On the other hand, this field scanning mode produces an overscanning at the "polar" area surrounding the vertical Z'Z where all the strips join.

Referring to FIG. 5, there is shown a second mode of scanning in which the scanning of the strips is accomplished through the rotation of the support 8. Each strip BPA is then scanned rapidly in azimuth. The strips BPA are successively shifted in elevation by a rotation of the prism 7 about the axis X'X. The rotation in elevation may be continuous, which corresponds to a progressive shift of the strips with a uniform speed, which poses then a problem of scanning in the vicinity of the vertical Z'Z, or alternatively said rotation in elevation can be performed step by step so that the strips BPA are successively shifted upward and downward. This latter mode of scanning implies that the most rapid and uniform speed rotation occurs at the support 8, mobile in azimuth relative to the frame 12. Under these conditions, the efficiency of scanning is higher since there is no longer an overscanning in the vertical direction. However, it appears that the angular speed in a strip BPA is not uniform when the strip is shifted in elevation, to become very high in the vertical. This problem can be solved at the servo control units 16 and 19 by means of optimal control of the rotation speeds. In any event, the derotating prism 20 is controlled to rotate at a speed equal to half that of the support 8.

The principle of operation of the scanning prism 7 will now be described with reference to FIGS. 8A through 6E. The prism 7, constructed in accordance to known techniques, exhibits the feature of permitting a scanning of an optical beam over more than 180° by a simple rotational motion about the axis X'X. According to the prior art method, this scanning over 180° is not possible by means of a mirror having an axis of rotation perpendicular to the optical axis of the beam since the mirror would then be seen from one of its edges during its rotation. FIGS. 6A through 6E illustrate five angular positions of the prism 7 corresponding to four rotations by 22°5 to the right about the axis X'X, respectively, from an initial aiming position oriented to the left (FIG. 6A) to a final aiming position oriented to the right (FIG. 6E). In these Figures, the lens 2, fixed during the rotation of the prism 7, is also shown schematically.

The prism 7 is comprised of two identical regular prisms 71 and 72 having isosceles trapezoid-shaped bases disposed perpendicularly to the axis of rotation X'X. The long sides 73 of the prisms 71 and 72 are coated with a total-reflection layer, are joined, and are longitudinally aligned with the axis X'X. Each prism 71 and 72 is therefore a total-reflection prism.

Except for the initial and final positions in a rotation, as shown in FIGS. 6A and 6E, it is apparent that the optical rays are divided into two portions which respectively pass through the prisms 71 and 72 and are totally reflected at the long sides. As a result of the propagation mode in this double prism 7, the rotation of the line of sight LV is twoce as rapid as the mechanical rotation of the prism 7 itself about the axis X'X. It is also apparent that, for a rotation of the prism 7 with a uniform speed when scanning a sector of at most 180°, the scanning efficiency is at least of 50%. As a matter of fact, the line of sight LV is directed during at most half of the rotation toward the inside of the frame 12 of the system, making the elevation scanning unusable. However, this unusable rotation can be avoided by an oscillating rotation of the prism 7 in a sector of about 90°.

What is claimed is:

1. An optoelectronic device for a target acquisition system, said device comprising:

an optical focusing means;

photodetector means disposed in the focal plane of said focusing means on an output side of said focusing means;

a double prism located on an input side of said focusing means opposite to said photodetector means;

first means for rotatably driving said double prism about an axis longitudinal to said double prism and perpendicular to an optical axis of said focusing means wherein said first means rotatably drives said double prism relative to a support;

second means for rotatably driving said support carrying said double prism about said optical axis;

means located between said double prism and said focusing means to hold an image of the target in a single direction in said focal plane, regardless of the rotations of said support carrying said double prism.

2. A device according to claim 1, comprising a frame to which are attached said focusing means and said photodetector means, and in which said support is mounted so that can rotate about said optical axis and is driven in rotation by said second means to drive in rotation.

3. A device according to any of claims 1 or 2, wherein said first and second means to drive in rotation respectively said double prism in said support and said support in said frame have rotation speeds different and locked to scan in an optimum manner at Least a full space of about $2\pi$ steradians.

4. A device according to any of claims 1 or 2, wherein said double prism comprises two right-angle prisms having long sides joined and aligned with said longitudinal axis.

5. A device according to any of claims 1 or 2, wherein said means to hold an image of the target in a single direction in said focal plane comprise a derotating prism.

6. A device according to claim 5, wherein said derotating prism is disposed along said optical axis, between said double prism and said focusing means, and is driven in rotation about said optical axis at an angular rotation speed equal to half that of said support.

7. A device according to claim 6, comprising a second support carrying said derotating prism, and a gear system with a gear ratio of ½ coupling said first and second supports coaxial with said optical axis.

* * * * *

UNITED STATES PATENT AND TRADEMARK OFFICE
CERTIFICATE OF CORRECTION

PATENT NO. : 5,512,741
DATED : April 30, 1996
INVENTOR(S) : Denis LEVAILLANT, et al.

It is certified that error appears in the above-indentified patent and that said Letters Patent is hereby corrected as shown below:

On the title page, in Item [75], the fourth inventor's name is missing. It should read:

--Raymond MATICHARD, Paris--

Signed and Sealed this

Twenty-third Day of July, 1996

Attest:

BRUCE LEHMAN

Attesting Officer

Commissioner of Patents and Trademarks